Aug. 6, 1940. W. F. LONGFIELD 2,210,088
MEANS FOR SUPPLYING FLUID UNDER PRESSURE TO A SHAFT
Filed March 22, 1939
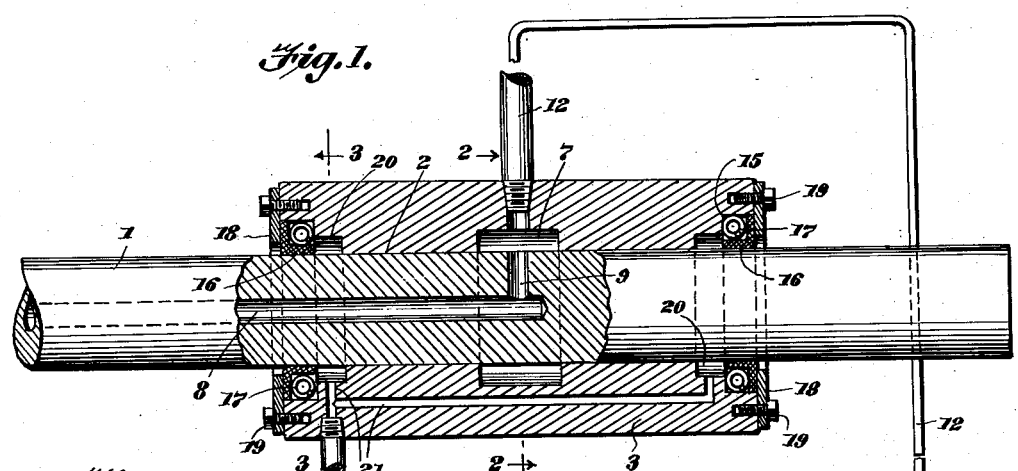
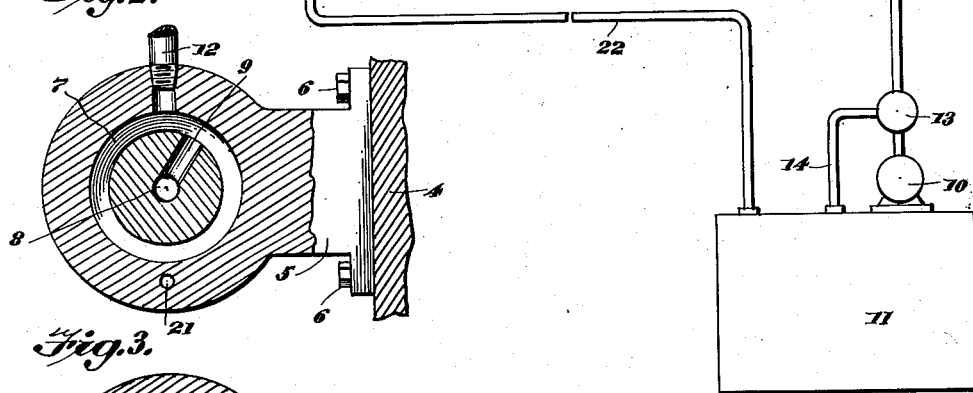
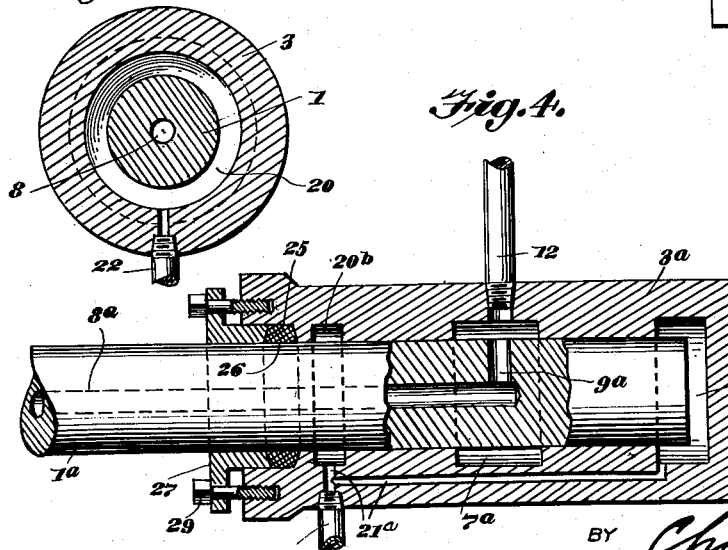
Inventor
WILLIAM F. LONGFIELD
BY Chas. H. Trotter
Attorney Patented Aug. 6, 1940

2,210,088

UNITED STATES PATENT OFFICE 2,210,088

MEANS FOR SUPPLYING FLUID UNDER PRESSURE TO A SHAFT

William F. Longfield, Cleveland, Ohio

Application March 22, 1939, Serial No. 263,560

2 Claims. (Cl. 285—96.3)

This invention relates generally to a conduit fitting or coupling, and more specifically to mechanism for supplying fluid under high pressure to the interior of a rapidly revolving shaft.

It is especially adapted for use with hydraulically operated mechanisms which are mounted on a revolvable shaft, and has for its principal object the provision of improved means for supplying fluid under high pressure to hydraulically operated mechanisms mounted on a revolvable shaft through a longitudinal bore therein.

Another object of the invention is the provision of novel and efficient means, in combination with the mechanism for supplying fluid to the interior of a rapidly revolving shaft, for preventing the loss of fluid around the exterior of the shaft, and which will eliminate the frequent adjustment and replacement of the packing.

Other and more limited objects of the invention will be apparent from the following specification and the accompanying drawing forming a part thereof, wherein Figure 1 is a central longitudinal section through one form of my invention; Figure 2, a transverse section taken on the line 2—2 of Figure 1; Figure 3 a section on line 3—3 of Figure 1, and Figure 4 is a view similar to Figure 1 of a modified form of my invention.

Referring now to the drawing, by reference characters, the numeral 1 designates a rotatable shaft, which is supported in suitable bearings not shown. This shaft extends through a bore 2 in a sleeve 3 which is fastened to any suitable stationary support 4. Any suitable means may be employed for holding this sleeve stationary. In the form shown herein, this means comprises an extension 5 extending rearwardly from the sleeve 3, which is bolted to a support 4 by bolts 6.

An annular recess 7 is formed within the sleeve 3, and surrounds the shaft as indicated in Figures 1 and 2. The shaft 1 has a longitudinal bore 8, therein which communicates at one end with any hydraulically operated mechanism (not shown), and at the other end, communicates through a transverse bore 9 with a recess 7.

Fluid is supplied under high pressure to the recess 7 and thence through the bores 8 and 9 to the aforesaid hydraulically operated mechanism by a pump 10, which draws fluid (preferably oil) from a reservoir 11 and forces it under high pressure through a pipe 12 into the recess 7. A valve 13 in the pipe 12, which may be either manually or automatically operated, controls the admission of fluid to the recess 7, and thus controls the operation of any mechanism operated by this fluid. When the valve 13 is in one position it connects the pump 10 with the recess 7, and when in another position disconnects the pump 10 from recess 7 and connects it to a return pipe 14, through which the fluid is returned to the reservoir 11.

In practice the diameter of the bore 2 is a few thousandths of an inch greater than the diameter of the shaft 1, so that oil may seep from the recess 7 along the shaft 1 within the bore 2 and thus lubricate the bore 2 and that part of the shaft 1 therein, so as to prevent wear of these parts due to the rapid rotation of the shaft 1.

In order to prevent oil from escaping from the sleeve 3 around the exterior of the shaft 1 suitable means are provided in the ends of the sleeve 3. In the form shown in Figures 1 to 3, this means comprises oil seals of standard well-known construction which comprises generally an annular flanged ring of leather or other suitable material 16 and a helical spring 17 which are inserted in grooves 15 formed in the ends of the sleeve 3 and retained therein by light metal plates 18 which are bolted to the sleeve 3 by bolts 19. These seals are not constructed to withstand high pressures; consequently some means must be provided to reduce the pressure of the oil seeping along the exterior of the shaft 1 from the recess 7 before it comes into engagement with these seals.

For this purpose, annular grooves 20 are provided between the recess 7 and the oil seals. These grooves are of lesser diameter than the grooves 15, and stand inwardly therefrom. A passageway 21, formed within the sleeve 3, establishes communication between the two grooves 20, and a pipe 22 connects this passageway 21 with the oil reservoir 11. The pressure in the grooves 20, conduit 21, and pipe 22, is substantially the same as the pressure in the reservoir 11, which in turn is a great deal less than the pressure at which the oil or fluid is forced into the recess 7. The oil seeping along the shaft 1 through the bore 2 in the sleeve 3 will enter the grooves 20, and be drained back through the passageway 21 and pipe 22 to the reservoir 11. It will thus be apparent that the pressure of any oil seeping along the shaft 1 through the bore 2 will be greatly reduced before coming in contact with the oil seals in the grooves 15. This will permit the use of light oil seals of this character which due to the low pressure of the oil coming in contact therewith do not have to engage the shaft 1 tightly to prevent the leakage of oil thereby, and thus, due to this light engagement with the shaft 1 will need no adjustment and will last a long time without replacement.

In the form shown in Figure 4, the shaft 1ª does not extend entirely through the sleeve 3ª, but terminates within an annular recess 20ª, formed as an enlarged extension of the bore 2ª. The sleeve 3ª has formed therein an annular recess 7ª, which is in communication with the longitudinal bore 8ª in the shaft 1ª through a transverse bore, 9ª. In this form is shown another type of standard packing gland, which comprises an annular recess 25 in one end of the sleeve 3ª, in which is secured any suitable packing 26 by means of a gland nut 27, held in place and adjusted longitudinally by means of bolts 28. An annular groove, 20ᵇ is formed with the sleeve 3ª between the recess 7ª and the packing gland. Conduit 21ª establishes communication between the annular recess 20ª and the groove 20ᵇ. In this form as in the form shown Figures 1 to 3, oil is supplied under high pressure to the recess 7ª from the pump 10, through the pipe 12; and oil is drained from the recess 20ª and the groove 20ᵇ back to the reservoir 11 through the pipe 22.

It is to be understood that the particular type of oil seal, or packing gland used is merely a matter of choice. The packing gland shown in Figure 4 could be used in place of the oil seals shown in Figure 1; and the oil seals shown in Figure 1 could be used in the form shown in Figure 4 instead of the packing gland illustrated herein.

From the foregoing, it would be apparent to those skilled in this art that I have provided a very simple and efficient structure for accomplishing the objects of my invention. It is to be understood that I am not limited to the particular forms shown and described herein, but that I am limited only by the scope of the appended claims.

Having thus described my invention, what I claim is:

1. In an assembly comprising, a shaft having a longitudinal bore therein, a sleeve having a packing gland at an end thereof thru which the shaft extends, said sleeve having an annular recess intermediate the ends thereof surrounding said shaft and in constant communication with the bore therein, means for supplying fluid under high pressure to said recess and means for preventing the full pressure of the fluid from being applied to the said packing gland, said second mentioned means comprising a circumferential groove in said sleeve intermediate said annular recess and said packing gland for receiving fluid seeping along the shaft and means for drawing off fluid from said groove to prevent the building up of pressure therein.

2. In an assembly comprising a shaft having a longitudinal bore therein, a sleeve having a packing gland at each end thereof thru which the shaft extends, said sleeve having an annular recess intermediate the ends thereof surrounding the shaft and in constant communication with the bore therein, means for supplying fluid under high pressure to said recess and means for preventing the full pressure of the fluid from being applied to the packing glands, said second mentioned means comprising a pair of circumferential grooves in said sleeve for receiving fluid seeping along the shaft, one groove intermediate each packing gland and said annular recess and means for drawing off fluid from the grooves to prevent the building up of pressure therein.

WILLIAM F. LONGFIELD.